(12) United States Patent
Seymour et al.

(10) Patent No.: US 8,521,610 B2
(45) Date of Patent: Aug. 27, 2013

(54) ONLINE AUCTION AND METHOD

(75) Inventors: Mark Seymour, Harrisburg, NC (US); Tim Pienta, Charlotte, NC (US)

(73) Assignee: Zero, LLC, Charlotte, NC (US)

( * ) Notice: Subject to any disclaimer, the term of this patent is extended or adjusted under 35 U.S.C. 154(b) by 370 days.

(21) Appl. No.: 12/797,696

(22) Filed: Jun. 10, 2010

(65) Prior Publication Data

US 2010/0318416 A1 Dec. 16, 2010

Related U.S. Application Data

(60) Provisional application No. 61/186,456, filed on Jun. 12, 2009.

(51) Int. Cl.
*G06Q 30/00* (2012.01)

(52) U.S. Cl.
USPC ............ 705/26.3; 705/14.23; 705/37; 705/80

(58) Field of Classification Search
USPC .................................. 705/26.3, 14.23, 37, 80
See application file for complete search history.

(56) References Cited

U.S. PATENT DOCUMENTS

| | | | |
|---|---|---|---|
| 7,853,484 B2 | 12/2010 | Yang et al. | |
| 7,904,347 B2 * | 3/2011 | Hasseler | 705/26.3 |
| 2002/0147674 A1 | 10/2002 | Gillman | |
| 2005/0216391 A1 * | 9/2005 | Tews | 705/37 |
| 2007/0094123 A1 * | 4/2007 | Yang et al. | 705/37 |
| 2009/0055263 A1 * | 2/2009 | Okubo et al. | 705/14 |
| 2012/0150691 A1 * | 6/2012 | Woolston | 705/26.61 |

FOREIGN PATENT DOCUMENTS

| | | |
|---|---|---|
| KR | 1020010008152 | 2/2001 |
| KR | 1020050114767 | 12/2005 |

* cited by examiner

*Primary Examiner* — Yogesh C Garg
(74) *Attorney, Agent, or Firm* — Trego, Hines & Ladenheim, PLLC (57) ABSTRACT

An online auction and method of conducting an online auction accessible over a communications network includes the step of providing a computer programmed to host the auction, the computer being accessible to a user through the communications network and adapted to provide a user interface to allow the user to bid on or sell an item on the auction. The method also including the steps of providing instructions to the computer through the user interface, the instructions providing parameters for the auction being conducted; and displaying the item for sale on the user interface with an initial sale price and prompting a bidder to bid on the item. The method further including the steps of allowing the bidder to bid on the item through the communications network, wherein in response to a bid by the bidder, the computer reduces the initial sale price by the bid value and displays a new sale price on the user interface; and using the computer to determine a winning bidder and shipping the item to the winning bidder.

5 Claims, 6 Drawing Sheets

ONLINE AUCTION AND METHOD

This application claims the benefit of Provisional Application No. 61/186,456 filed on Jun. 12, 2009.

TECHNICAL FIELD AND BACKGROUND OF THE INVENTION

The present invention relates to online auctions and, more particularly, to a method of running an online auction.

Online auctions have become a favorite way for millions of consumers to buy and sell products. Auction houses such as EBAY and SWOOPO have become very popular due to the ease and convenience with which an individual having access to the Internet can list a product for sale or locate a product that he or she wishes to buy.

Conventionally, online auctions can occur 24 hours per day, seven days per week. While auctions allow individuals to often buy products for less money, they can often cause individuals to pay more for a product due to someone coming in at the end of an auction and bidding up the price. These types of auctions reward individuals who only participate at the end of an auction, or punish those who pay more because of the bidding war that ensues at the end of the auction.

Accordingly, there is a need for an auction that rewards individuals for bidding early in the auction and does not punish those individuals with higher prices due to a bidding war at the end of the auction.

BRIEF SUMMARY OF THE INVENTION

These and other shortcomings of the prior art are addressed by the present invention, an online auction includes a computer programmed to host the auction, the computer being accessible to a user through a communications network and adapted to provide a user interface to allow a user to bid on or sell an item on the auction; and a plurality of auction modules executed by the computer in response to a pre-set event, the modules being adapted to conduct various stages of the auction such that a winner of the auction is determined. The auction modules include a Get-It-Now module executed by the computer when a bidder purchases the item being sold on the auction at a pre-determined price, thereby ending the auction; a bid module executed by the computer in response to the Get-It-Now module not being executed, the bid module controls the auction until the auction times out or until a sale price of the item being sold reaches zero; and a going once mode module executed by the computer in response to completion of the bid module, the going once mode module being adapted to continue the auction until the going once mode module times out or until no more bids are placed. Upon completion of the auction, the computer determines a winner of the auction.

According to one aspect of the present invention, a method of conducting an auction in an online environment accessible over a communications network, includes the steps of providing a computer programmed to host the auction, the computer being accessible to a user through the communications network and adapted to provide a user interface to allow the user to bid on or sell an item on the auction; providing instructions to the computer through the user interface, the instructions providing parameters for the auction being conducted; and displaying the item for sale on the user interface with an initial sale price and prompting a bidder to bid on the item. The method further including the steps of allowing the bidder to bid on the item through the communications network, wherein in response to a bid by the bidder, the computer reduces the initial sale price by a bid value and displays a new sale price on the user interface; and using the computer to determine a winning bidder and shipping the item to the winning bidder.

According to another aspect of the present invention, a method of conducting an auction in an online environment accessible over a communications network including the steps of providing a computer having software thereon to host and control the auction, the computer being accessible to a user through the communications network and adapted to provide a user interface to allow users to interact with the auction; and displaying the item for sale on the user interface with the initial sale price and prompting a bidder to bid on the item. The method further including the steps of allowing the bidder to bid on the item through the communications network using the user interface, wherein in response to a bid by the bidder, the computer reduces the initial sale price by the bid value and displays a new sale price on the user interface, and wherein the computer continues to reduce a new sale price by the bid value in response to bids until a new sale price reaches zero or until the auction times out, the computer initiating a going once mode upon the new sale price reaching zero or the auction timing out; and using the computer to determine a winning bidder and shipping the item to the winning bidder.

BRIEF DESCRIPTION OF THE DRAWINGS

The invention may be best understood by reference to the following description in conjunction with the accompanying drawing figures in which.

DESCRIPTION OF THE PREFERRED EMBODIMENT AND BEST MODE

Figure 1:
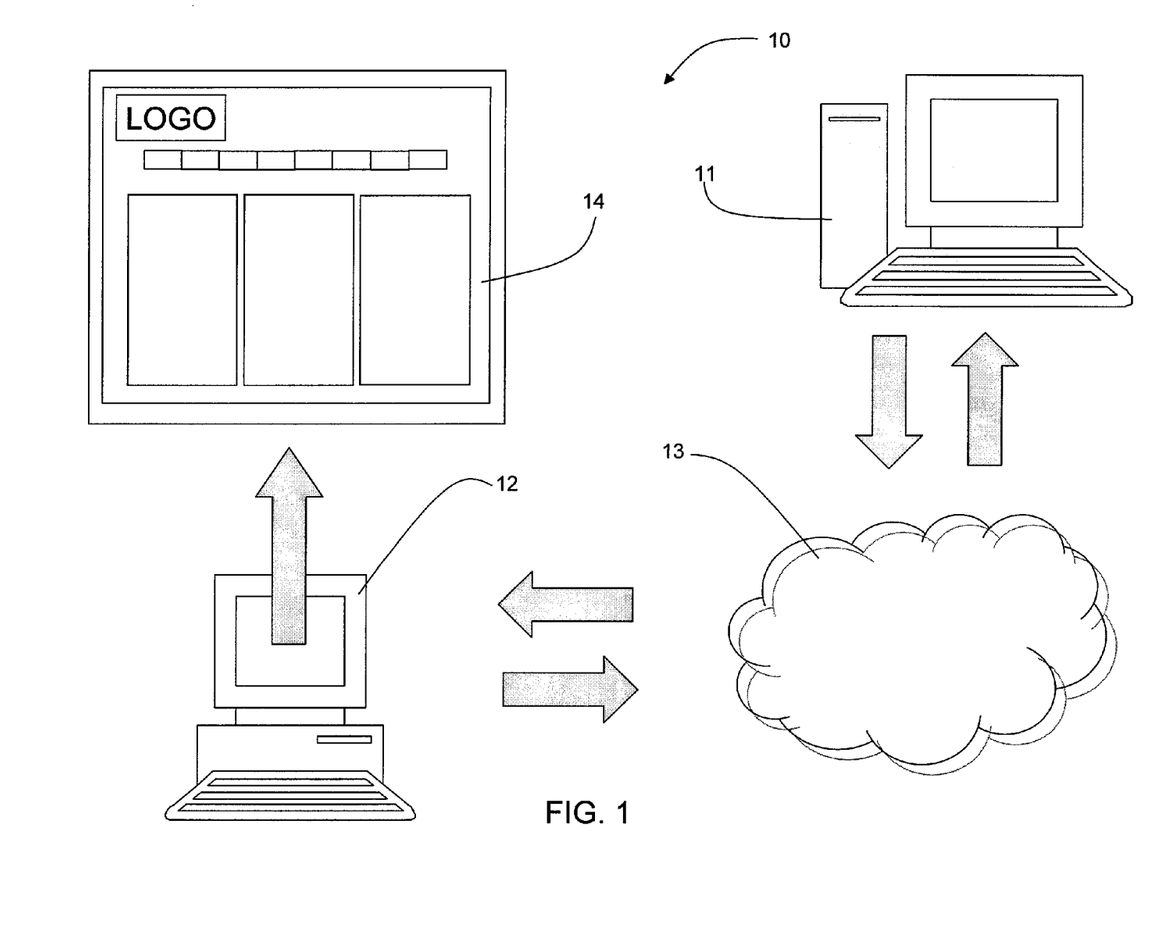
FIG. 1 shows a general schematic of an online auction.

Referring now specifically to the drawings, an online auction and method according to an embodiment of the invention is illustrated in FIG. 1 and shown generally at reference numeral 10. The auction 10 is a software-based website contained on servers 11 that provides a secure platform for buyers and sellers to conduct transactions. The website is accessed via a computer 12 through an internet or communications network 13 and provides a user interface 14 that allows both buyers and sellers to access features associated with the auction 10.

Figure 2:
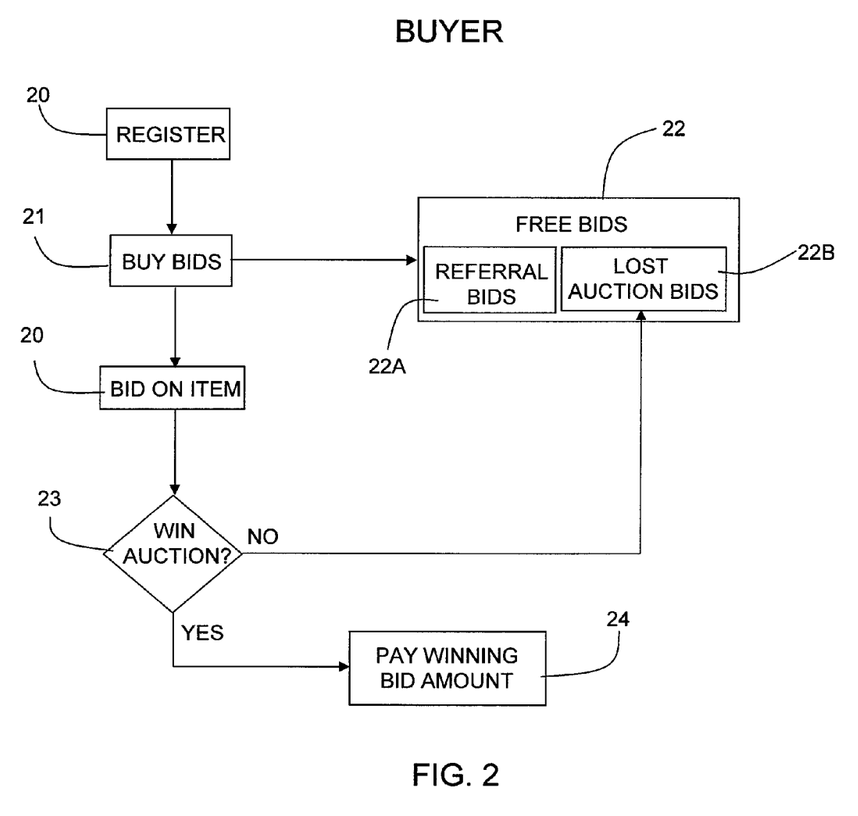
FIG. 2 shows a flow diagram for a buyer.

The auction 10 is set up for both buyers and sellers. As shown in FIG. 2, buyers are permitted to register with the auction 10 for free (Block 20) using a registration module of the software. Once registered, buyers purchase bids (Block 21). The bids may be purchased in increments or blocks. For example, bids may be purchased in increments of 1, 5, 10, 20, etc. In addition, for each bid purchased, the buyer will receive a determined amount of free bids, Block 22, that can be used in a free bids auction (described later). The buyer may also receive free bids by referring another buyer (Block 22A) to the auction 10 or by losing (Block 22B) the auction 10.

Once the buyer has purchased bids, Block 21, the buyer is permitted to bid on the item up for sale, Block 23. If the buyer wins the auction 10, the buyer pays the seller the bid amount, Block 24, but if the buyer loses the auction 10, the buyer receives free bids (Block 22B) equal to the number of bids the buyer cast in the auction 10. If the buyer wins the auction 10, the buyer may turn around and sell the item for a profit. In this case, the buyer signs up as a seller for a one time fee plus a listing fee. The listing fee may be a percentage or a set dollar amount.

Figure 3:
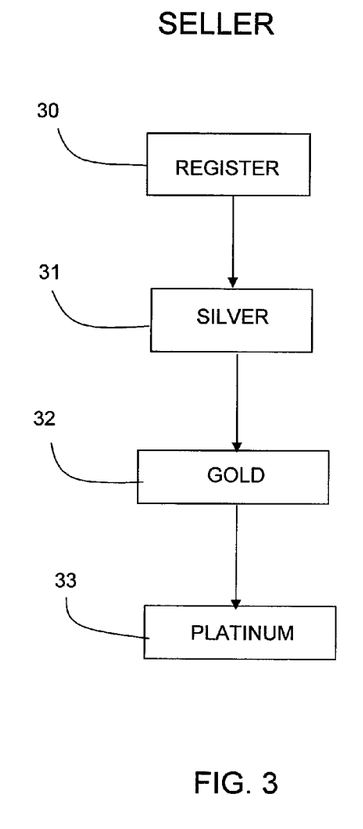
FIG. 3 shows a flow diagram for a seller.

As shown in FIG. 3, sellers are registered with the auction 10, Block 30, using the registration module, and must choose between one of three membership levels, Blocks 31-33. Each of the membership levels provide benefits to the seller for a preset monthly fee, as well as listing fees, etc. For example, if a seller chose a silver membership, the seller would be provided with a low monthly fee, a listing fee per auction, and a certain percentage of profit based on an item selling for more than auction list price. If the seller chose a platinum membership, the seller would incur a bigger monthly fee, but in exchange would receive a private storefront, and a larger percentage of profit for items selling above the auction list price.

For example, once the seller has signed up for a membership package and has paid the monthly fee, the seller is then permitted to place an item on the auction 10. The seller would pay a 2% listing fee based on the list price of the item. So, a $300.00 item would incur a $6.00 listing fee. If the item sells for $600.00-$300.00 more than the listing price, then the seller would receive the $300.00 list price plus a percentage of the additional $300.00. So, if the seller receives 60% of the additional $300.00, the seller would receive a total of $480.00 for the item sold.

Figure 4:
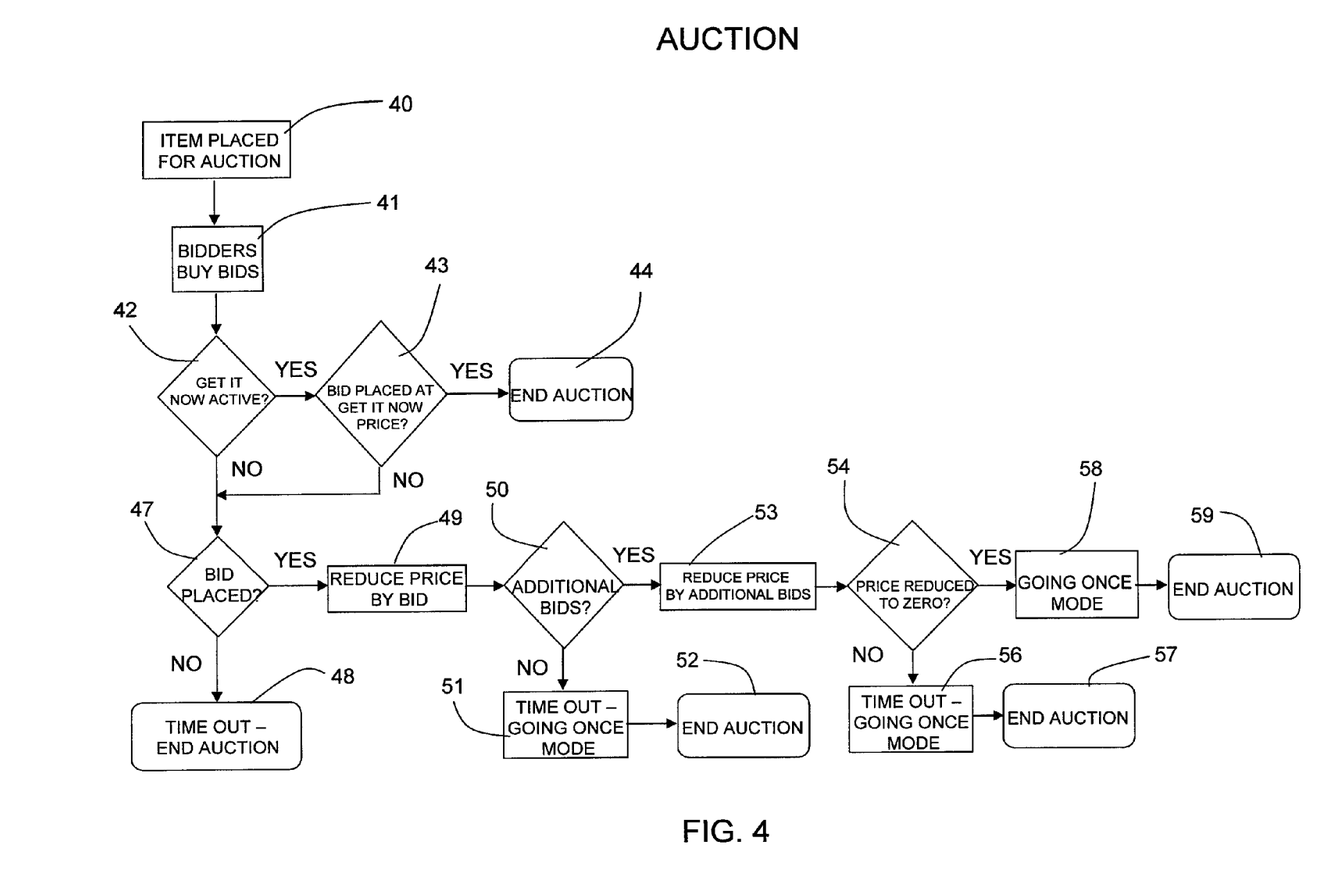
FIG. 4 shows a flow diagram for the auction.

Referring to FIG. 4, the auction 10 provides a buyer four ways to win the auction 10. As shown, the auction 10 operates by first having a seller place an item up for auction (Block 40). Prior to placing the item up for auction, the seller has the option of setting up parameters for the auction 10. For example, the seller can activate a "Get It Now" feature which allows buyers to purchase the item at a "Get It Now" price. In addition, the seller may determine the value of the bids during the auction 10. For example, the seller may value the first twenty bids at $1.00, the next fifty bids at $0.50 and so on.

At Block 41, buyers purchase bids for use in the auction 10. If the "Get It Now" feature has been activated (Block 42) by the seller using a Get It Now module of the software, the buyer may place a bid at the "Get It Now" price, Block 43, and purchase the item, thereby ending the auction, Block 44. If the "Get It Now" feature has not been activated, or a bid is not placed at the "Get It Now" price, then a bid module of the software instructs the computer 11 to send the auction into normal bidding, Block 47. If no bids are received on an item, then the auction times out (Block 48) and the auction 10 is ended. Each auction will have a predetermined time, for example, three days.

If a bid is placed, Block 47, then the list price is reduced by the value of the bid, Block 49. For example, if the list price is $300.00 and the bid value is $1.00, then the price of the item is reduced to $299.00. If there are no additional bids, Block 50, then the auction 10 times out and a going once mode module instructs the computer 11 to send the auction into "Going Once Mode", Block 51. Going Once Mode is described in more detail with reference to FIG. 5. If no additional bids are placed during the "Going Once Mode", then the auction 10 ends (Block 52) and the buyer pays the seller the $299.00 sale price. The seller also receives the bid value, so if the bid value was $1.00, then the seller would receive the $299.00 sale price plus the $1.00 bid value for a total of $300.00. If additional bids are received, Block 50, then the price of the item continues to be reduced (Block 53) by the value of the bids.

If the price of the item is not reduced to $0.00, Block 54, and the time for the auction has run out, then the auction 10 goes into "Going Once Mode", Block 56. Once the "Going Once Mode", Block 56, has finished, the auction ends, Block 57. The winning buyer pays the seller the sale price which could be as low as $0.00. The seller also receives a percentage of all bids over the actual listing price. If the price of the item is reduced to $0.00 prior to the time running out, Block 54, then the auction 10 goes into "Going Once Mode", Block 58. The "Going Once Mode", Block 58 will continue until no bidders are bidding or until time runs out, Block 59. If there is still more than one bidder for the item and time runs out, then the winner will be the person who bid the most often in the auction 10. If there is a tie, then the person who bid earliest in the auction will win.

Figure 5:
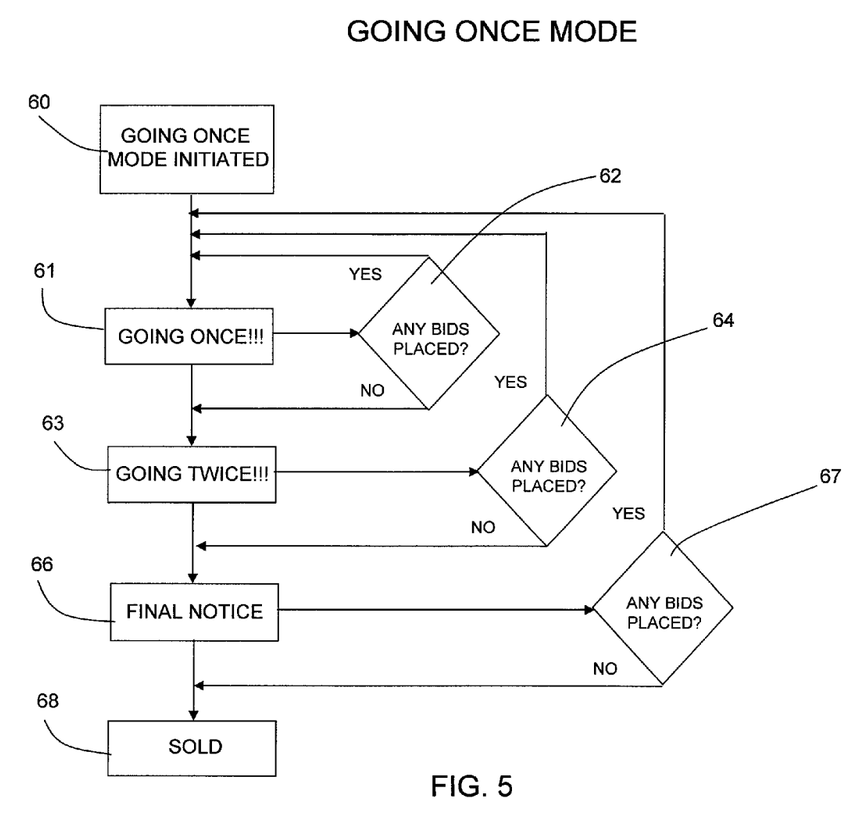
FIG. 5 shows a flow diagram for "Going Once Mode" of the auction shown in FIG. 4.

Referring to FIG. 5, the "Going Once Mode" is an important mechanism in the auction 10. As shown, once the "Going Once Mode" is initiated, Block 60, the auction software flashes "Going Once", Block 61, for a predetermined time, such as 3 seconds, and then flashes "Bid Now" for a predetermined time. If a bid is placed during that time (Block 62), then "Going Once Mode" is restarted. If no bids are placed (Block 62), then the software flashes "Going Twice", Block 63, for a predetermined time and then flashes "Bid Now" for a predetermined time. If a bid is placed during that time (Block 64), then "Going Once Mode" is restarted. If no bids are placed (Block 64), then the software flashes "Final Notice", Block 66, for a predetermined time and then flashes "Bid Now" for a predetermined time. If no bid is placed during that time (Block 67), then the software flashes "Sold", Block 68, and the auction 10 is over. If a bid is placed during that time, Block 67, then the "Going Once Mode" is restarted.

Like the regular auction, the "Going Once Mode" is regulated by a time limit. If bids keep coming in for the item, then the "Going Once Mode" will end by time, and a winner will be declared. If the bids stop, then the "Going Once Mode" will end by virtue of there being no further bids to restart the Mode.

Figure 6:
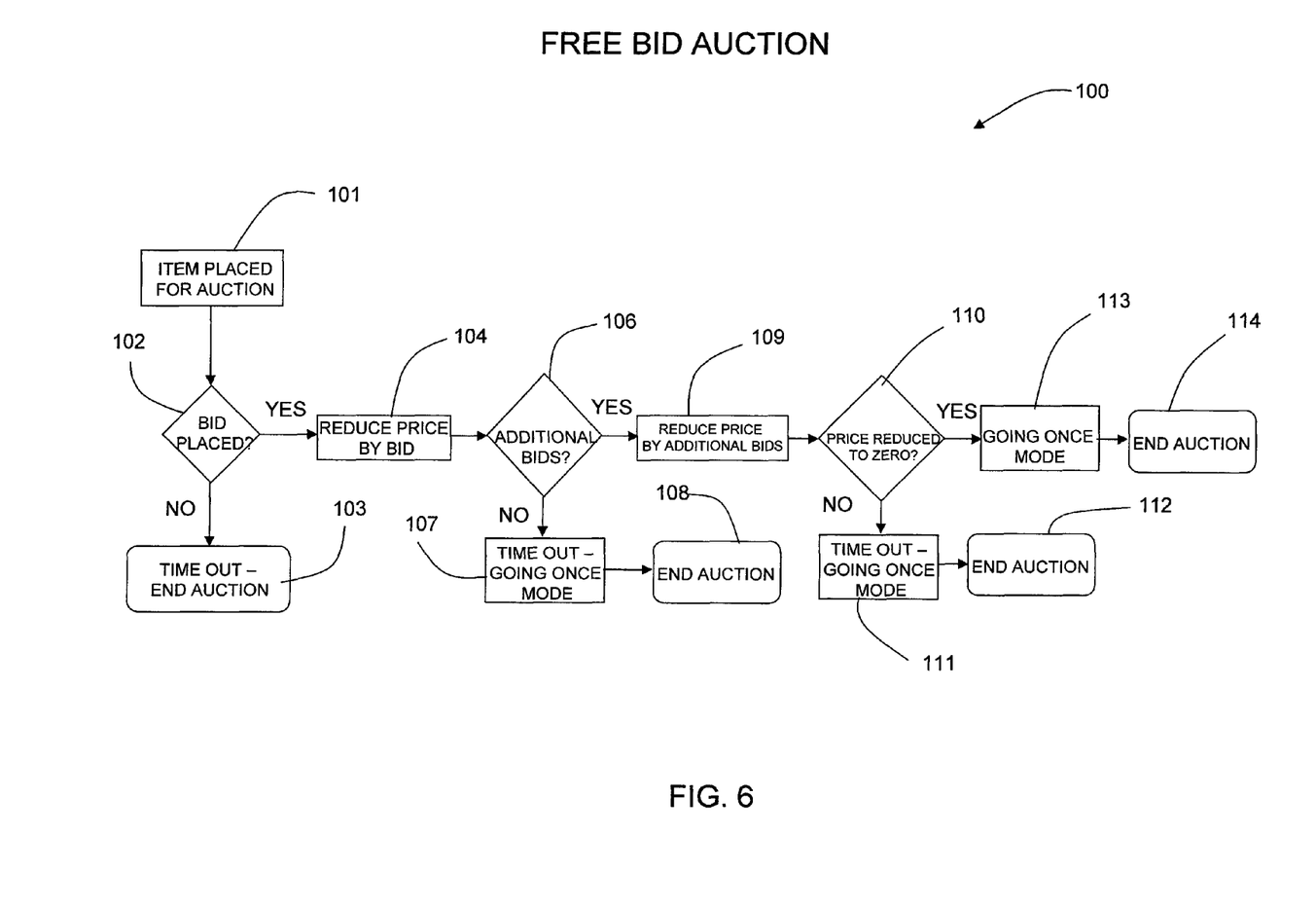
FIG. 6 shows a flow diagram for a free bid auction.

Buyers who have earned free bids may also enter a free bid auction 100, FIG. 6. Free bids cannot be purchased and can only be granted, as disclosed above with reference to FIG. 2. Free bid auctions are run by an auction controller, as opposed to a seller. Like auction 10, auction 100 places an item up for auction for buyers to bid on, Block 101. The main difference is that only individuals with free bids may participate in the auction 100.

If no bids are placed, Block 102, the auction 100 times out and the auction is over, Block 103. If a bid is placed, Block 102, the list price of the item is reduced by the bid value, Block 104. If no additional bids are cast, Block 106, then the auction 100 times out and goes into "Going Once Mode", Block 107. If no additional bids are placed during the "Going Once Mode", then the auction 100 ends (Block 108) and the buyer pays the seller the sale price. If additional bids are received, Block 106, then the price of the item continues to be reduced (Block 109) by the value of the bids.

If the price of the item is not reduced to $0.00, Block 110, and the time for the auction has run out, then the auction 100 goes into "Going Once Mode", Block 111. Once the "Going Once Mode", Block 111, has finished, the auction ends, Block 112, and the winning buyer pays the sale price. If the price of the item is reduced to $0.00 prior to the time running out, Block 110, then the auction 100 goes into "Going Once Mode", Block 113. The "Going Once Mode", Block 113 will continue until no bidders are bidding or until time runs out and the auction ends, Block 114. If there is still more than one bidder for the item and time runs out, then the winner will be the person who bid the most often in the auction 100. If there is a tie, then the person who bid earliest in the auction 100 will win.

An online auction and method is described above. Various details of the invention may be changed without departing from its scope. Furthermore, the foregoing description of the preferred embodiments of the invention and best mode for practicing the invention are provided for the purpose of illustration only and not for the purpose of limitation.

We claim:

1. An online auction system, comprising:
   (a) a computer programmed to host the auction, the computer being accessible to a user through a communications network and adapted to provide a user interface to allow a user to purchase bids, bid on, or sell an item on the auction;
   (b) a plurality of auction modules executed by the computer in response to a pre\-set event, the modules being adapted to conduct various stages of the auction such that a winner of the auction is determined, the auction modules comprising:
      (i) a Get-It-Now module executed by the computer when a user purchases the item being sold on the auction at a pre-determined price, thereby ending the auction;
      (ii) a bid module executed by the computer in response to the Get-It-Now module not being executed, the bid module programmed to receive bids previously purchased by the user and to control the auction such that:
         (a) if no bids are received, then the auction times out; or
         (b) if bids are received, then a sale price of the item being sold decreases by a value of the bids until the sale price reaches zero or too much time passes between subsequent bids causing the auction to time out; and
      (iii) a going once mode module executed by the computer in response to completion of the bid module, the going once mode module being adapted to continue the auction until the going once mode module times out or until no more bids are placed; and
   (c) wherein upon completion of the auction, the computer determines a winner of the auction.

2. The online auction according to claim 1, wherein the Get-It-Now module is activated by a seller of an item upon submission of the item to the online auction.

3. The online auction according to claim 1, wherein the going once mode module instructs the computer to flash a visual indicator on the user interface, thereby notifying a user that the auction has entered going once mode.

4. The online auction according to claim 1, wherein the bid module instructs the computer to end the auction in response to the auction timing out without a bid being submitted.

5. The online auction according to claim 1, further including a registration module adapted to allow users of the online auction to register as a seller or a bidder.

\* \* \* \* \*

UNITED STATES PATENT AND TRADEMARK OFFICE
CERTIFICATE OF CORRECTION

PATENT NO. : 8,521,610 B2  
APPLICATION NO. : 12/797696  
DATED : August 27, 2013  
INVENTOR(S) : Seymour et al.

Page 1 of 1

It is certified that error appears in the above-identified patent and that said Letters Patent is hereby corrected as shown below:

In the Claims:

Column 5, line 19, in claim 1.(b) "a pre\-set event,", should read --a pre-set event,--

Signed and Sealed this  
Twelfth Day of November, 2013

Teresa Stanek Rea  
*Deputy Director of the United States Patent and Trademark Office*